United States Patent
Endou et al.

(10) Patent No.: US 6,863,281 B2
(45) Date of Patent: Mar. 8, 2005

(54) CHUCKING APPARATUS AND PRODUCTION METHOD FOR THE SAME

(75) Inventors: Kazunori Endou, Funabashi (JP); Hiroshi Inazumachi, Funabashi (JP)

(73) Assignee: Sumitomo Osaka Cement Co., Ltd. (JP)

( * ) Notice: Subject to any disclaimer, the term of this patent is extended or adjusted under 35 U.S.C. 154(b) by 237 days.

(21) Appl. No.: 10/235,585

(22) Filed: Sep. 5, 2002

(65) Prior Publication Data

US 2003/0090070 A1 May 15, 2003

(30) Foreign Application Priority Data

Sep. 13, 2001 (JP) .................................... 2001-278360

(51) Int. Cl.[7] .............................................. H02N 13/00
(52) U.S. Cl. ................................... 279/128; 361/234
(58) Field of Search .................... 279/128; 364/234, 364/233; 269/8; 118/500

(56) References Cited

U.S. PATENT DOCUMENTS

| | | | | |
|---|---|---|---|---|
| 5,463,526 A | * | 10/1995 | Mundt ........................ | 361/234 |
| 5,531,835 A | * | 7/1996 | Fodor et al. ................ | 118/728 |
| 5,777,838 A | * | 7/1998 | Tamagawa et al. ......... | 361/234 |
| 5,841,624 A | * | 11/1998 | Xu et al. ..................... | 361/234 |
| 5,903,428 A | * | 5/1999 | Grimard et al. ............ | 361/234 |
| 5,986,874 A | * | 11/1999 | Ross et al. .................. | 361/234 |
| 6,028,762 A | * | 2/2000 | Kamitani .................... | 361/234 |
| 6,556,414 B2 | * | 4/2003 | Kosakai ...................... | 361/234 |
| 6,608,745 B2 | * | 8/2003 | Tsuruta et al. ............. | 361/234 |
| 2002/0036373 A1 | | 3/2002 | Kosakai | |
| 2004/0055709 A1 | * | 3/2004 | Boyd et al. ............ | 156/345.51 |

FOREIGN PATENT DOCUMENTS

| | | |
|---|---|---|
| JP | Hei 04304941 | 10/1992 |
| JP | Hei 05006933 | 1/1993 |
| JP | Hei 06216224 | 8/1994 |
| JP | Hei 07153825 | 6/1995 |
| JP | Hei 10189699 | 7/1998 |
| JP | 2001 341043 | 12/2001 |
| JP | 2002 151580 | 5/2002 |

OTHER PUBLICATIONS

English Abstract of Japanese Application No. Hei 04–304941 dated Oct. 28, 1992.
English Abstract of Japanese Application No. Hei 05–006933 dated Jan. 14, 1993.
English Abstract of Japanese Application No. Hei 06–216224 dated Aug. 05, 1994.
English Abstract of Japanese Application No. Hei 07–153825 dated Jun. 16, 1995.
English Abstract of Japanese Application No. Hei 10–189699 dated Jul. 21, 1998.
English Abstract of Japanese Application No. 2001–341043 dated Dec. 11, 2001.
English Abstract of Japanese Application No. 2002–151580 dated May 24, 2002.

* cited by examiner

Primary Examiner—Daniel W. Howell
(74) Attorney, Agent, or Firm—Ostrolenk, Faber, Gerb & Soffen, LLP

(57) ABSTRACT

One object of the present invention is to provide a chucking apparatus and its production method that is capable of carrying out holding, alignment, transport and so forth without causing problems such as the generation of particles. In order to achieve this object, the present invention provides a chucking apparatus provided with a base in which protrusions or grooves are formed on one of its faces to form an irregular surface, and the apical surfaces of protrusions of the irregular surface serve as a chucking surface for chucking and holding a plate-shaped sample, wherein the apical and lateral surfaces of the above protrusions, and the bottom surfaces of the above indentations, are all polished.

5 Claims, 3 Drawing Sheets

CHUCKING APPARATUS AND PRODUCTION METHOD FOR THE SAME

BACKGROUND OF THE INVENTION

1. Field of the Invention

The present invention relates to a chucking apparatus and its production method, and more particularly, to a chucking apparatus and its production method that is preferably used on the production lines of semiconductor devices such as IC, LSI and VLSI, and is capable of carrying out holding, alignment, transport and so forth of plate-shaped samples such as silicon wafers without causing problems such as the generation of particles.

2. Description of the Related Art

In the past, when performing holding, alignment, transport and so forth of plate-shaped samples such as silicon wafers, glass substrates and printed boards on the production lines of semiconductor devices such as IC, LSI and VLSI, the production lines of display devices such as liquid crystal displays (LCD) and plasma displays (PDP), and the assembly lines of hybrid ICs and so forth, chucking apparatuses were used that chucked and held these plate-shaped samples by electrostatic chuck systems or vacuum chuck systems.

A known example of a chucking apparatus used in the prior art is a chucking apparatus having a structure in which the upper surface of a base that chucks and clamps a plate-shaped sample is made to be an chucking surface, protrusions or grooves are formed in this chucking surface by sandblasting and so forth to form an irregular surface, and together with grinding the apices of the protrusions of this irregular surface to form a chucking surface for the plate-shaped sample, the indentations of this irregular surface are used as a supply path for a cooling gas such as helium (He).

In this type of chucking apparatus, lift pins for releasing the plate-shaped sample from the chucking surface are provided at locations on the back of the above base corresponding to the periphery of the plate-shaped sample.

In this type of chucking apparatus, adequate chucking force in terms of use is secured by making the contact surfaces with the plate-shaped sample (apices of the protrusions) into mirrored surfaces by polishing, and by making the total surface area of these contact surfaces within a prescribed range with respect to the chucking surface. In addition, by forming indentations in the chucking surface, the adherence of particles on the silicon wafer or other plate-shaped sample can be inhibited, and the plate-shaped sample can be easily released from the chucking surface. Moreover, by using these indentations as a supply path of a cooling gas such as helium, the plate-shaped sample can be cooled and controlled to a suitable temperature.

However, it is becoming necessary to provide the previously mentioned semiconductor devices of the prior art with higher levels of performance and at lower prices, and their production lines are being similarly required to offer further reductions in production costs by improving the production yield of silicon wafers and so forth. In addition, silicon wafers and other plate-shaped samples are being required to be free of adherence of particles more than in the past in order to improve the production yield of silicon wafers and so forth.

Therefore, as a result of conducting earnest studies in order to respond to these requirements, the inventors of the present invention found that the chucking apparatuses of the prior art had the problems indicated below.

(1) In the case of releasing a plate-shaped sample from the upper surface of the base by lifting the plate-shaped sample using lift pins, since this release takes place in a stepwise manner, there is contact between the back of the plate-shaped sample and the apices and sides of the protrusions of the chucking surface, causing rubbing of the back surface of the plate-shaped sample and resulting in the generation of particles.

(2) As shown in FIG. 6, when lift pins are raised to release a plate-shaped sample from the chucking surface of the base, since bending and other partial deformation occurs in plate-shaped sample 1 accompanying raising of the lift pins, the plate-shaped sample 1 is unable to be maintained parallel with respect to irregular surface 3 functioning as the chucking surface of chucking apparatus 2. As a result, the back of the plate-shaped sample 1 makes contact with and rubs against the bottom surfaces of the indentations of irregular surface 3 that have not been polished, resulting in the generation of particles. Furthermore, FIG. 6 shows an enlarged view of the length in the direction of thickness to facilitate understanding.

SUMMARY OF THE INVENTION

In order to solve the above problems, the object of the present invention is to provide a chucking apparatus and its production method that is capable of carrying out holding, alignment, transport and so forth without causing problems such as generation of particles.

As a result of earnest studies, the inventors of the present invention found that, by polishing to a mirrored surface the apical and lateral surfaces of protrusions of an irregular surface functioning as the chucking surface of a base, and the bottom surfaces of indentations of the irregular surface, the generation of particles can be prevented when releasing a plate-shaped sample from the chucking surface using lift pins and so forth even in the case of contact between the back of the plate-shaped sample and the apical and lateral surfaces of the protrusions of the chucking surface, or contact by the back with the bottom surfaces of the protrusions of the chucking surface, due to partial deformation of the plate-shaped sample.

Namely, in order to achieve the above object, the present invention provides a chucking apparatus provided with a base in which protrusions or grooves are formed on one of its faces to form an irregular surface, and the apical surface of protrusions of the irregular surface serve as a chucking surface for chucking and holding a plate-shaped sample, wherein the apical and lateral surfaces of the above protrusions, and the bottom surfaces of the above indentations are all polished.

In this chucking apparatus, not only the apical surface of the above protrusions, but also the lateral surfaces of the above protrusions and the bottom surfaces of the above indentations are polished. In other words, an chucking surface is formed in which not only the chucking surface of the plate-shaped sample, but also all portions for which there is the possibility of being contacted by the plate-shaped sample are polished. Consequently, even in the case of contact between the lateral surfaces of the protrusions and the bottom surfaces of the indentations with the plate-shaped sample, since there is little friction between them, the generation of particles can be prevented. More specifically, the generation of particles can be prevented when a plate-shaped sample held on the chucking surface is released from the chucking surface using lift pins and so forth even in the case of contact between the back of the plate-shaped sample with the apical and lateral surfaces of the chucking surface, or contact by the back of the plate-shaped sample with the bottom surfaces of indentations of the chucking surface, due to partial deformation of the plate-shaped sample.

In the above chucking apparatus, the surface roughness Ra of the apical and lateral surfaces of the above protrusions and the bottom surfaces of the above indentations is preferably 0.25 S or less.

According to this chucking apparatus, since the apical and lateral surfaces of the above protrusions, and the bottom surfaces of the above indentations have a mirrored surface, friction between the chucking surface and the plate-shaped sample is extremely low. As a result, generation of particles can be further prevented.

In the above chucking apparatus, the cross-sectional shape of the apical peripheral edges of the above protrusions is preferably curved. In other words, it is preferable that chamfered portions are formed between the apical surface and lateral surfaces without forming corners between the apical and lateral surfaces of the protrusions, and that the cross-sectional shape of the chamfered portions is curved. Furthermore, the lateral surfaces of the protrusions refer to not only the lateral surfaces of the protrusions, but also the portion that includes the apical peripheral edge of the protrusions.

According to this chucking apparatus, friction between the chucking surface and the plate-shaped sample can be made to be extremely low, enabling the generation of particles to be further prevented.

In the above chucking apparatus, the total surface area of the apical surface of the above protrusions is preferably 0.3–20% of the total surface area of the above chucking surface.

According to this chucking apparatus, it is difficult for particles present on the chucking surface to be adhered to the plate-shaped sample. Moreover, release of the plate-shaped sample following discontinuation of the application of voltage can be secured.

In the above chucking apparatus, the height of the above protrusions is preferably 1–30 $\mu$m.

The reason for numerically restricting the height of the above protrusions in this manner is because if the height of the above protrusions, namely the depth of the indentations (grooves) of the irregular surface, is less than 1 $\mu$m, it becomes difficult to cool the plate-shaped sample from the back by allowing cooling gas to flow into these indentations in the case of using these indentations as a supply path for a cooling gas such as He, while the problem also occurs in which the plate-shaped sample ends up lifting up due to particles present in the indentations thereby resulting in decreased absorption force and making it difficult to improve the uniformity of the surface temperature of the plate-shaped sample. In addition, if the height of the above protrusions exceeds 30 $\mu$m, chucking force in the indentations (grooves) decreases, which is undesirable since it causes a decrease in overall chucking force.

In addition, in order to achieve the above object, the present invention provides a production method of a chucking apparatus provided with a base in which protrusions or grooves are formed on one of its faces to form an irregular surface, and the apical surface of protrusions of the irregular surface serve as a chucking surface for chucking and holding a plate-shaped sample, comprising the steps of: a step in which protrusions or grooves are formed on one face of the above base to form an irregular surface; and a step in which the irregular surface is polished using abrasive grit and a buffing material.

In this production method of a chucking apparatus, since an irregular surface is polished using abrasive grit and a buffing material, the apical and lateral surfaces of the protrusions of the irregular surface as well as the bottom surfaces of the indentations can be polished easily. Moreover, since the apical and lateral surfaces of the protrusions as well as the bottom surfaces of the indentations can be polished simultaneously, the cost required for the polishing step can be reduced. In other words, according to the above production method of a chucking apparatus, a chucking apparatus can be provided inexpensively that is able to improve the yield of products that apply a plate-shaped sample while preventing the risk of generation of particles on the plate-shaped sample.

In addition, in order to achieve the above object, the present invention provides a production method of a chucking apparatus provided with a base in which protrusions or grooves are formed on one of its faces to form an irregular surface, and the apical surface of protrusions of the irregular surface serve as a chucking surface for chucking and holding the plate-shaped sample, comprising the steps of: a step in which protrusions or grooves are formed on the main face of a base to form an irregular surface; and a step in which the irregular surface is polished using abrasive grit and ultrasonic waves.

In this production method of a chucking apparatus, since the irregular surface is polished using abrasive grit and ultrasonic waves, the apical and lateral surfaces of the protrusions of the irregular surface as well as the bottom surface of the indentations can be polished easily. Moreover, since the apical and lateral surfaces of the protrusions as well as the bottom surfaces of the indentations can be polished simultaneously, the cost required for the polishing step can be reduced. In other words, according to the above production method of a chucking apparatus, a chucking apparatus can be provided inexpensively that is able to improve the yield of products that apply a plate-shaped sample while preventing the risk of the generation of particles on the plate-shaped sample.

DETAILED DESCRIPTION OF THE PREFERRED EMBODIMENTS

The following provides an explanation of the chucking apparatus of the present invention along with its production method. Here, an explanation is provided of an electrostatic chuck of the type in which the high-frequency electrodes for plasma generation are integrated into a single unit while the heater electrodes are not integrated into a single unit.

Furthermore, the present embodiments for carrying out the invention are described for providing a detailed explanation for facilitating understanding of the gist of the present invention, and unless specified otherwise, does not limit the present invention in any way.

Figure 1:
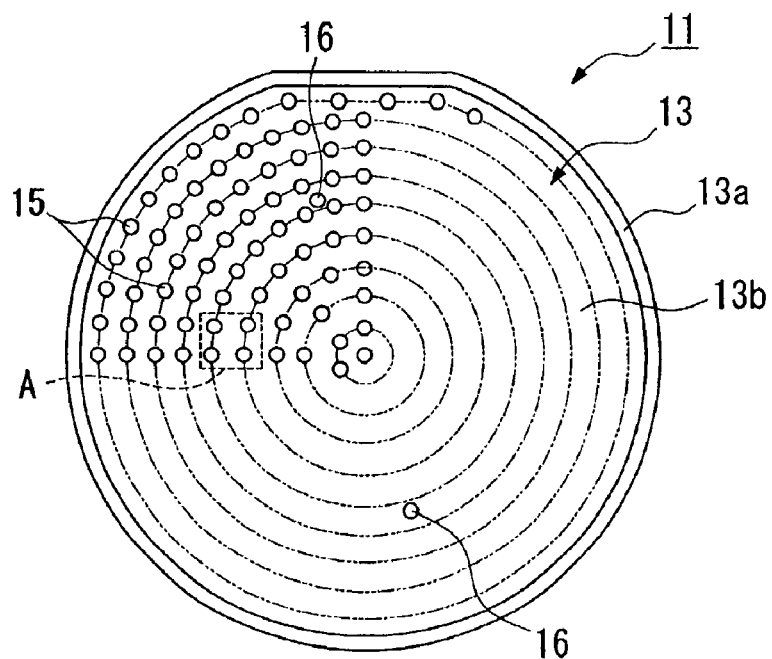
FIG. 1 is an overhead view of an electrostatic chuck that is one embodiment of the present invention.
Figure 2:
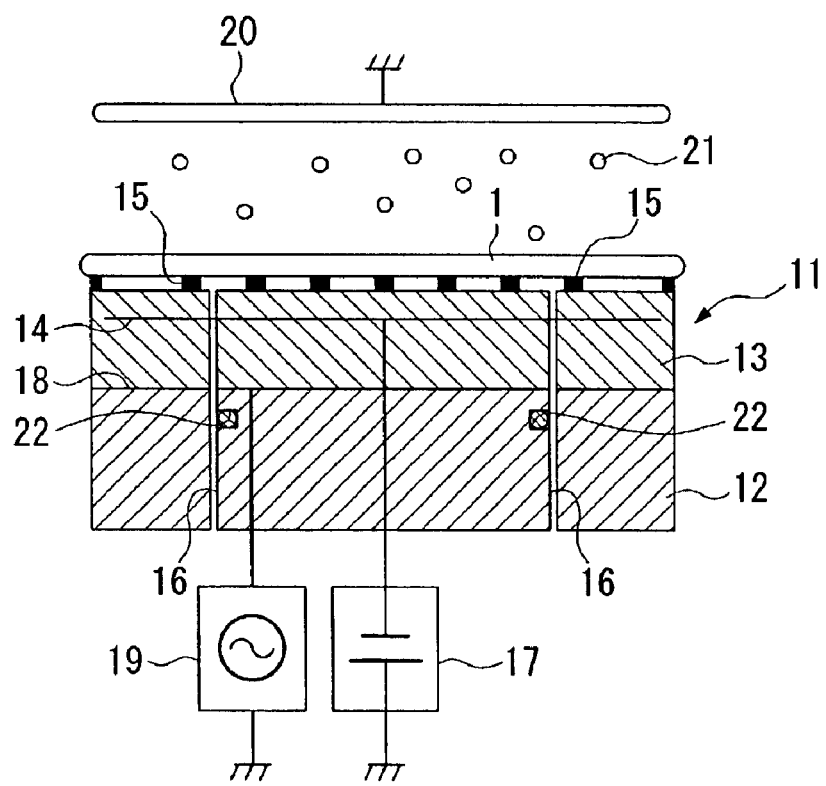
FIG. 2 is an enlarged cross-sectional view of the essential portion showing an electrostatic chuck that is one embodiment of the present invention.

FIG. 1 is an overhead view showing an electrostatic chuck of one embodiment of the present invention, FIG. 2 is an enlarged cross-sectional view of the essential portion that is an enlargement of region A of FIG. 1, and in this FIG. 2, the composition of the plasma treatment apparatus is added to facilitate understanding of the composition of the electrostatic chuck.

As shown in the drawings, an electrostatic chuck 11 has a dielectric 13 joined as a flat substrate on metal plate 12, and internal electrode 14 is embedded or clamped within this dielectric 13.

Peripheral wall 13a, having the same height as protrusions 15 to be described later and having a width of 0.3 mm, is formed on the upper surface of the dielectric 13 so as to prevent the leakage of He or other cooling gas, and as a result, a chucking surface (chucking and holding surface) 13b is formed to the inside of this peripheral wall 13a. A large number of protrusions 15 are provided upright on this chucking surface 13b, resulting in the formation of an irregular surface. The apices of the above protrusions 15 function as chucking surfaces for plate-shaped sample 1. The portion of chucking surface 13b that is not provided with upright protrusions 15 remains as the bottom surfaces 27 of indentations 26. Furthermore, the peripheral wall 13a may be integrally formed with the dielectric 13, or formed as a separate member.

Figure 3:
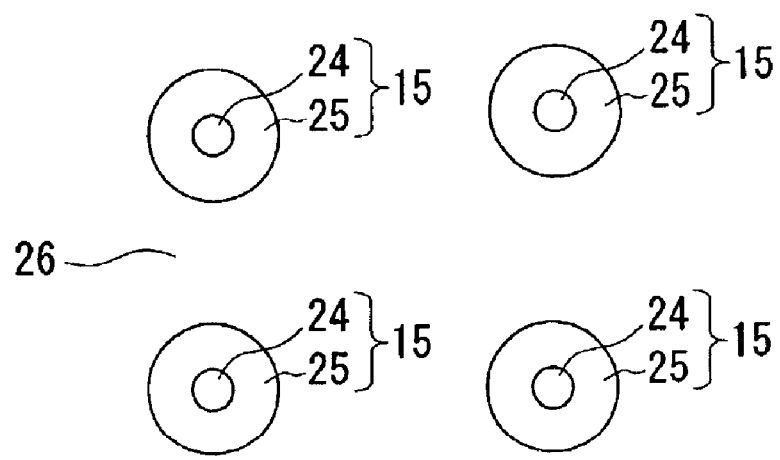
FIG. 3 is an overhead view showing the structure of the irregular surface of an electrostatic chuck that is one embodiment of the present invention.
Figure 4:
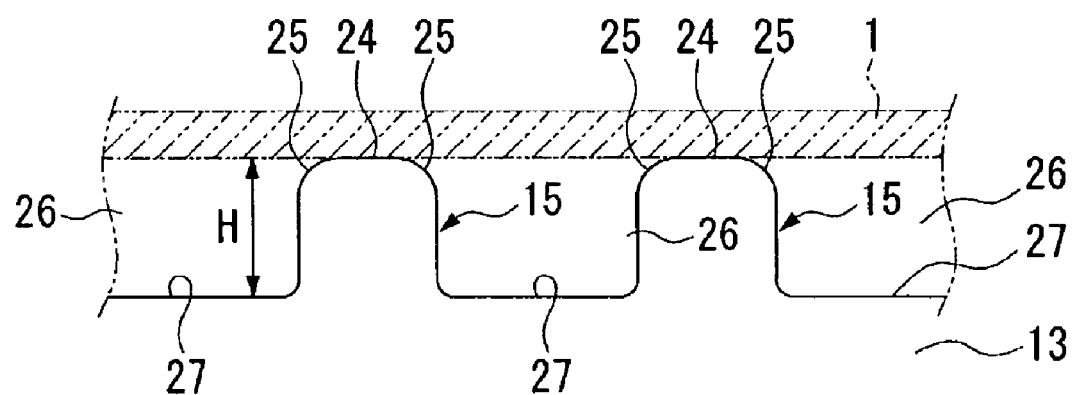
FIG. 4 is a cross-sectional view showing the structure of the irregular surface of an electrostatic chuck that is one embodiment of the present invention.

As shown in FIGS. 3 and 4, protrusions 15 have a shape in which the apical surface is smaller than the cross-section of the base. In addition, at the tips of protrusions 15, the peripheral edge of apical surface 24 is formed to have a rounded (curved) cross-section. In other words, a curved chamfered portion is formed at the portion of the lateral surface 25 of protrusions 15 that makes contact with apical surface 24.

Moreover, the apical surface 24 and lateral surface 25 of protrusions 15 and the bottom surface 27 of the indentations 26 are polished to a mirrored surface so that their surface roughness Ra is 0.25 S or less, respectively. Namely, the entire chucking surface 13b that holds the plate-shaped sample 1 is polished to a mirrored surface.

Cooling gas feed holes 16 that pass through the metal plate 12 and the dielectric 13 are formed in metal plate 12 and dielectric 13, and a cooling gas such as He is supplied to the gap between the upper surface of the dielectric 13 and the lower surface of the plate-shaped sample via these cooling gas feed holes 16. Moreover, flow paths 22 through which cooling medium flows for cooling the electrostatic chuck 11 are formed inside the metal plate 12.

In addition, direct current power supply circuit 17 is connected to the internal electrode 14, and high-frequency power supply circuit 19 is connected to conductor 18 of the lower surface of the dielectric 13. Furthermore, this high-frequency power supply circuit 19 may also be connected to the internal electrode 14. In addition, a grounded counter electrode 20 is arranged above the electrostatic chuck 11 so as to oppose the upper surface of the electrostatic chuck 11.

In this electrostatic chuck 11, by placing the plate-shaped sample 1 on the dielectric 13 and applying a direct current voltage to the internal electrode 14 to generate electrostatic force, the plate-shaped sample 1 is chucked onto the dielectric 13, and more specifically, onto the apical surfaces 24 of the protrusions 15 and the upper surface of the peripheral wall 13a, due to this electrostatic force. In addition, by applying a high frequency from the high-frequency power supply circuit 19, active radicals 21 are generated between the electrostatic chuck 1 and the counter electrode 20, and these active radicals 21 etch the silicon oxide film and so forth on the surface of the plate-shaped sample 1.

The surface area ratio of the total surface area of the apical surfaces 24 of the above protrusions to the chucking surface 13b is preferably within the range of 0.3–20%, and more preferably within the range of 1–10%. The reason for limiting the surface area ratio to 0.3% or more is to secure the required chucking force, and the reason for limiting it to 20% or less is to make it difficult to adhere debris present on the chucking surface 13b, and to secure release of the plate-shaped sample 1 after discontinuing the application of voltage.

The height H of the protrusions 15 formed on the chucking surface 13b is preferably 1–30 $\mu$m. If height H of the protrusions 15 is less than 1 $\mu$m, it becomes difficult for cooling gas such as He to flow to the lower surface of the plate-shaped sample 1. In addition, this is also not effective for preventing adherence of particles, causes a decrease in chucking force due to the occurrence of lifting in the plate-shaped sample 1, and makes it difficult to improve the uniformity of internal temperature of the plate-shaped sample 1. In addition, if height H of the protrusions 15 exceeds 30 $\mu$m, absorption force decreases on the bottom surface (groove) 27 of the indentations 26, which is not preferable since this causes a decrease in overall chucking force.

Next, an explanation is provided of the production method of the electrostatic chuck of the present embodiment based on FIG. 5.

To begin with, formation of the protrusions 15 can be carried out using mechanical forming such as whetstone forming or laser engraving, or by sandblasting and so forth. In addition, polishing of the irregular surface, namely polishing of the apical surface 24 and the lateral surface 25 of the protrusions 15 as well as the bottom surface 27 of the indentations 26, can be efficiently carried out by (1) buffing using fine abrasive grit and a buffing material, or (2) ultrasonic polishing using fine abrasive grit and ultrasonic waves.

The following provides an explanation of the case of using sandblasting for the method of forming the protrusions 15 on the chucking surface 13, and the case of using (1) buffing using fine abrasive grit and a buffing material for the method for polishing the irregular surface with reference to FIG. 5 as well as FIGS. 1 and 3.

Figure 5A:
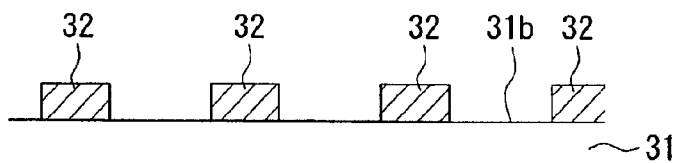
FIG. 5 is a process drawing showing the production method of an electrostatic chuck that is one embodiment of the present invention.

To begin with, as shown in FIG. 5A, a mask 32 in the shape of a prescribed pattern is formed on the chucking surface 13b. The shape of the pattern of this mask 32 is the same as the shape of the pattern of the protrusion 15 shown in FIG. 1. A photosensitive resin or plate-shaped mask are preferably used for this mask 32. The method is in accordance with routine methods.

Figure 5B:
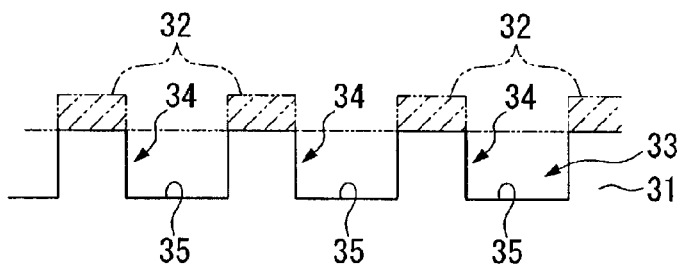

Next, as shown in FIG. 5B, sandblasting is carried out to form the indentations 33 at those portions not covered by the mask 32. As a result, those portions covered by the mask 32 remain in the form of protrusions 34, and the spaces between these protrusions 34 become bottom surfaces 35 of the indentations 33.

Alumina, silicon carbide, glass beads and so forth are preferably used as the abrasive grit used in this sandblasting, the particle diameter of the abrasive grit is preferably from about under 300 mesh (that which passes through 300 mesh) to over 1,500 mesh (that which does not pass through 1500 mesh).

Subsequently, the mask 32 is removed. At this time, a releasing liquid such as methylene chloride is used if the mask 32 is made of a photosensitive resin.

Figure 5C:
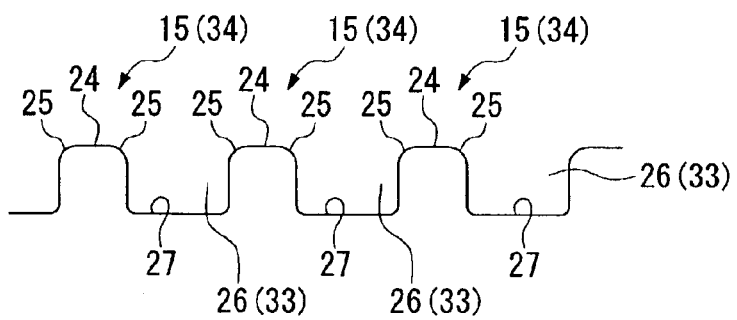
Figure 6:
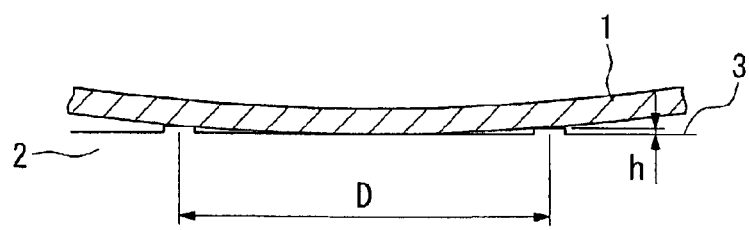
FIG. 6 is an explanatory drawing showing problems of an electrostatic chuck of the prior art.

Next, the apical and lateral surfaces of the protrusions 34 and the bottom surfaces 35 of the indentations 33 are simultaneously polished to a mirrored surface by buffing using fine abrasive grit and a buffing material so that the surface roughness Ra is 0.25 S or less to obtain an electrostatic chuck in which the apical surfaces 24 and lateral surfaces 25 of the protrusions 15 as well as the bottom surfaces 27 of the indentations 26 are both polished to a mirrored surface as shown in FIG. 5C.

Furthermore, as a result of buffing, together with the apical and lateral surfaces of protrusions 34 as well as the bottom surfaces 35 of the indentations 33 being polished to a mirrored surface, the peripheral edges of the apical surfaces of the protrusions 34 are chamfered and given roundness.

Although abrasive grit similar to that used in sandblasting, for example, can be used for the above fine abrasive grit, the particle diameter of the fine abrasive grit is preferably from about under 800 mesh (that which passes through 800 mesh) to over 1,500 mesh (that which does not pass through 1500 mesh). In addition, there are no particular restrictions on the buffing material, and for example, a resin buffing material can be used.

During this buffing, it is preferable to buff in multiple stages using a finer abrasive grit for each successive step, for example, polishing in multiple steps starting with, for example, fine abrasive grit of 800 mesh followed by fine abrasive grit of 1,000 mesh and finally proceeding to the use of fine abrasive grit of 1,500 mesh, so that the abrasive grit used becomes finer with each step. Other conditions for buffing may be in accordance with ordinary methods, and for example, a method is used in which polishing is performed using a buffing material while pouring an abrasive slurry containing the above fine abrasive grit onto the polished surface.

Following polishing, the chucking surface 13b is washed. This washing is carried out with, for example, an organic solvent such as acetone to degrease the chucking surface 13b. Following this degreasing, the chucking surface 13b is rinsed with, for example, warm water.

In this production method of an electrostatic chuck, since the bottom surfaces 35 of the indentations 33 can be polished easily, and the apical surfaces 24 and the lateral surfaces 25 of the protrusions 34 as well as the bottom surfaces 35 of the indentations 33 can be polished simultaneously, polishing costs can be reduced and as a result, an electrostatic chuck capable of improving the product yield of a semiconductor wafer or other plate-shaped sample 1 can be provided inexpensively without causing generation of particles.

The following provides a more detailed explanation of the chucking apparatus and production method of a chucking apparatus of the present invention using the following Example and Comparative Example.

EXAMPLE

The electrostatic chuck obtained in this embodiment was produced according to the production method, the values of surface roughness Ra of the apical surfaces 24 and lateral surfaces 25 of the protrusions 15 as well as the bottom surfaces 27 of the indentations 26 were 0.25 S, the surface area ratio of the total surface area of the apical surfaces 24 of the protrusions 15 relative to that of the chucking surface 13b was 1%, and the height H of the protrusions 15 was 10 μm.

A plate-shaped sample was chucked using this electrostatic chuck while allowing He gas at $1.33 \times 10^3$ Pa (10 torr) to flow through the indentations (grooves) 26, and the electrostatic chucking force, the chucking time and the release time of the electrostatic chuck were measured at room temperature. Here, an 8-inch silicon (Si) wafer was used for the plate-shaped sample. The measurement results are shown in Table 1.

Here, the chucking time refers to the amount of time until the electrostatic chucking force when a direct current voltage of 500 V was applied reaches 100 $gf/cm^2$, namely about 9,800 Pa. The release time refers to the amount of time until the electrostatic chucking force reaches 10 $gf/cm^2$, namely about 980 Pa, from the time the application of voltage is stopped after applying a direct current voltage of 500 V for 1 minute.

In addition, the number of particles on the back of the wafer was counted after chucking the 8-inch Si wafer for 1 minute by applying a direct currently voltage of 500 V using this electrostatic chuck. The measurement results are also shown in Table 1.

COMPARATIVE EXAMPLE

An electrostatic chuck for a comparative example was produced that differed from the electrostatic chuck of the Example only with respect to not polishing to a mirrored surface the lateral surfaces of the protrusions 34 and the bottom surfaces 35 of the indentations 33.

Namely, the upper surface of dielectric 31, namely the chucking surface 31b that chucks the plate-shaped sample, was polished to a flat surface having a surface roughness Ra of 0.25 S, and this flat chucking surface 31b was washed in the same manner as in the Example.

Next, the mask 32 was formed on this chucking surface 31b, and sandblasting was carried out to remove the mask 32 followed by washing the chucking surface 31b, in the same manner as in the Example.

The electrostatic chucking force, the chucking time and the release time were measured at room temperature for the electrostatic chuck produced in this Comparative Example, in the same manner as in the Example. In addition, the amount of adhered particles was also measured. These measurement results are shown in Table 1.

TABLE 1

| | Electrostatic chucking characteristics | | | |
| --- | --- | --- | --- | --- |
| | Electrostatic chucking force (kPa) | Chucking time (sec) | Release time (sec) | Particle count (number of particles) |
| Example | 9.8 | 2 | 2 | 600 |
| Comparative Example | 9.8 | 2 | 2 | 1600 |

According to Table 1, although there was no difference between the Example and Comparative Example with respect to electrostatic chucking force, in contrast to the particle count of the Example being only 600, that of the Comparative Example was about 2.7 times higher at 1,600, thereby confirming the electrostatic chuck obtained in the Example to be superior.

As has been explained above, according to the chucking apparatus of the Example, since the apical surfaces 24 and lateral surfaces 25 of the protrusions 15 and the bottom surfaces 27 of the indentations 26, namely the entire surface that chucks the plate-shaped sample 1, are polished, there is no risk of the generation of particles caused by rubbing against the back of the plate-shaped sample 1, even if there is contact between the back of plate-shaped sample 1 and the apical surfaces 24 and lateral surfaces 25 of the protrusions 15 on the chucking surface during raising of the lift pins, or contact by the back of the plate-shaped sample 1 with the bottom surfaces 27 of the indentations 26 due to partial deformation of the plate-shaped sample 1.

According to the production method of a chucking apparatus of the Example, since the apical and lateral surfaces of the protrusions 34 and the bottom surfaces 35 of the indentations 33 are polished using abrasive grit and a buffing material, the bottom surfaces 35 of the indentations 33 can also be polished easily. Moreover, since the apical and lateral surfaces of the protrusions 34 and the bottom surfaces 35 of the indentations 33 can be polished simultaneously, polishing costs can be reduced. Thus, an electrostatic chuck capable of improving the product yield of the plate-shaped sample 1 such as a semiconductor wafer can be provided inexpensively.

Although the above has provided an explanation of an embodiment of the chucking apparatus and its production method of the present invention based on the drawings, the specific constitution is not limited to the Example, but rather the design and so forth may be altered within a range that does not deviate from the gist of the present invention.

For example, although an electrostatic chuck of a form in which the high-frequency electrodes for plasma generation are integrated into a single unit, while the heater electrodes are not integrated, was explained as an example of a chucking apparatus in the Example, the chucking apparatus is only required to employ a constitution in which the apical and lateral surfaces of the protrusions of an irregular surface serving as the chucking surface, as well as the bottom surfaces of the indentations, are polished, and electrostatic chucks of a different form from that described above, or other forms of chucking apparatuses such as a vacuum chuck, can naturally also be applied.

What is claimed is:

1. An chucking apparatus provided with a base in which protrusions or grooves are formed on one of its faces to form an irregular surface, and the apical surfaces of said protrusions of said irregular surface serve as a chucking surface for chucking and holding a plate-shaped sample;

wherein said apical and lateral surfaces of said protrusions and the bottom surfaces of said indentations are all polished.

2. A chucking apparatus according to claim 1, wherein the surface roughness Ra of said apical and lateral surfaces of said protrusions and the bottom surfaces of said indentations is 0.25 S or less.

3. A chucking apparatus according to claim 1, wherein the cross-sectional shape of the apical peripheral edges of said protrusions is curved.

4. The chucking apparatus according to claim 1, wherein the total surface area of the apical surfaces of said protrusions is 0.3–20% relative to a value of 100% for the total surface area of said chucking surface.

5. A chucking apparatus according to claim 1, wherein the height of said protrusions is 1–30 $\mu$m.

* * * * *